United States Patent [19]

Russell et al.

[11] Patent Number: 4,913,266

[45] Date of Patent: Apr. 3, 1990

[54] DISC BRAKES

[75] Inventors: David F. Russell, Mickle Trafford; Simon B. Dobson, Birkenhead; Alexander J. Williams, Crosby, all of England

[73] Assignee: Lucas Industries public limited company, Birmingham, England

[21] Appl. No.: 248,443

[22] Filed: Sep. 23, 1988

[30] Foreign Application Priority Data

Sep. 23, 1987 [GB] United Kingdom ................ 8722349

[51] Int. Cl.[4] ............................................ F16D 65/12
[52] U.S. Cl. ............................ 188/18 A; 188/218 XL; 188/264 A; 192/70.13; 192/106.1; 403/291; 464/78; 464/99
[58] Field of Search .... 188/218 XL, 264 A, 264 AA, 188/18 A; 192/70.13, 106.1; 403/291; 464/78, 81, 98, 99, 160; 267/160

[56] References Cited

U.S. PATENT DOCUMENTS

| | | | |
|---|---|---|---|
| 1,216,307 | 2/1917 | Guthrie | 464/98 X |
| 1,460,212 | 6/1923 | Olive | 464/98 |
| 2,256,712 | 9/1941 | Hunt | 192/106.1 X |
| 2,753,959 | 7/1956 | Johnson | 188/218 XL |
| 2,908,358 | 10/1959 | Erickson | 188/218 XL X |
| 3,661,235 | 5/1972 | Harrison | 188/218 XL |
| 4,353,444 | 10/1982 | Bionaz | 192/106.1 X |
| 4,501,346 | 2/1985 | Bogenschutz | 188/218 XL |
| 4,641,731 | 2/1987 | Kawaguchi et al. | 188/218 XL |

FOREIGN PATENT DOCUMENTS

| | | | |
|---|---|---|---|
| 3216108 | 12/1982 | Fed. Rep. of Germany | 188/218 XL |
| 1562996 | 3/1969 | France | 188/218 AL |
| 444231 | 1/1949 | Italy | 188/18 A |
| 2172676 | 9/1986 | United Kingdom | 188/218 XL |

Primary Examiner—George E. A. Halvosa
Attorney, Agent, or Firm—Scrivener and Clarke

[57] ABSTRACT

The present specification discloses a braking disc for a disc brake. The braking disc comprises an annular disc member with a number of radially inwardly projecting lugs, located coaxially with respect to a central hub member which has a number of radially outwardly projecting lugs, the lugs on the hub member being located between adjacent lugs on the annular disc member. The lugs on said members are interconnected by at least one resilient member which is designed to flex generally radially but not circumferentially. Thus the or each resilient member positively transmits circumferential torque forces but is sufficiently flexible to allow for radial deflection due to thermal expansion of the disc member, without being over-stressed.

8 Claims, 3 Drawing Sheets

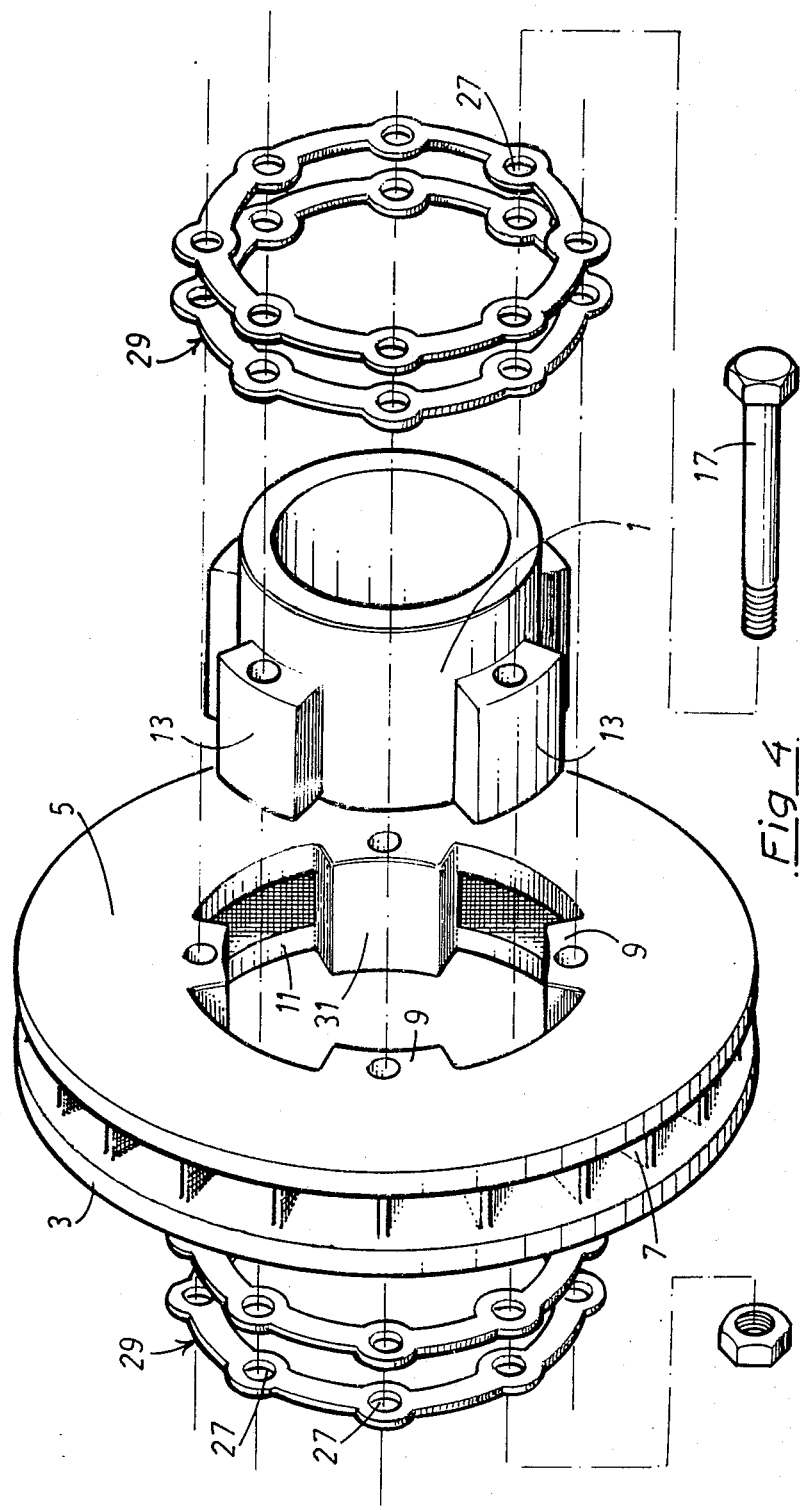

DISC BRAKES

The present invention relates to a disc for use in a disc brake.

In particular the present invention relates to a braking disc which is, in use, mounted directly on an axle of a vehicle, e.g., a railway vehicle. Various known braking discs of the axle mounted type are secured on a vehicle axle in different ways. However, each known type of axle mounted braking disc has a problem or disadvantage, whether it be a limitation in the braking duty which may be accommodated, or merely that the construction is expensive to manufacture as desired.

For example, in one known construction the disc comprises a pair of annular disc members which are coaxially arranged both with respect to each other and with respect to a cylindrical hub member, the hub member having a generally axially and radially projecting extension which is cast into a central web integrally formed between and with the annular disc members. In use, the hub member is a force fit on part of an axle and any expansion of the annular disc members due to heat produced under braking causes said radial extension to flex. Whilst the construction provides adequate thermal braking capacity and the positive transfer of torque at all times, it is expensive to manufacture the hub members and to cast its radial extension into said central web.

In another known construction of this type the disc comprises a pair of annular disc members integrally formed together and coaxially arranged with respect to a cylindrical hub member, the inner periphery of the disc members and the outer periphery of the hub member being provided with corresponding radially inwardly and radially outwardly extending projections respectively, said corresponding projections overlapping and engaging each other, and being bolted together to secure the disc members and hub member together. The bolts extend parallel to the axis of the hub members, through aligned bores in said projections. Said bores are enlarged in comparison with said bolts to allow for an amount of movement between overlapping and engaging projections when the force of expansion due to the heat expansion produced by braking, is sufficient to overcome the friction between said projections caused by the grip of the bolts. Whilst the friction grip is satisfactory for certain applications, heavy braking of heavy, high speed vehicles at regular and frequent intervals causes the braking disc to expand and contract to a considerable degree, possibly resulting in wear of the overlapping and engaging projections and ultimately in the bolts loosening. In this way the initial positive location of the disc members relative to the hub member fails, the hub and disc members moving relative to each other as the bolts move in the bores. Thus, even though this type of disc is relatively cheap to produce, it does not have the required performance in certain applications.

It is the aim of the present invention to produce a braking disc for axle mounting, which is relatively cheap to manufacture and which provides for the required circumferential positive torque transfer whilst allowing for radial heat expansion under heavy braking.

According to the present invention there is provided a disc for a disc brake comprising an annular disc member coaxially arranged with respect to a hub member, said disc member and said hub member being interconnected by at least one resilient member which is designed to flex generally radially but not circumferentially, of said hub and disc members.

In one embodiment of the present invention two like resilient members are provided, each being made of a resilient, flexible metal sheeting and having a cylindrical portion and a radially outwardly extending flange portion projecting from one axial end region of said cylindrical portion. Equally spaced apart slots extend radially, through the flange portion from the perimeter of the flange portion, and part way along the axial length of the cylindrical portion. Each tongue formed between adjacent slots is provided with an aperture through which a bolt extends in the completely assembled disc. The hub member is cylindrical and has a number of radially outwardly projecting lugs which locate between a like number of radially inwardly projecting lugs formed on the inner periphery of the annular disc member, in the completed disc, said resilient members being coaxially superposed over the hub member with adjacent tongues of said resilient members being secured by said bolts, one to a lug of the hub member and the other to a lug of the disc member. Thus, in use, the resilient member provides for positive torque transfer in the circumferential direction whilst the flange/cylindrical formation allows for resilient radial movement due to heat expansion. This construction is advantageous in its performance and in the fact that it is cheap to manufacture the individual components of the hub, disc and resilient members.

In another embodiment of the present invention, the hub and annular disc members are constructed as per said one embodiment, the sole difference lying in the construction of said resilient members. Each resilient member is in the form of a ring made of a flexible metal with a number of equi-spaced apart apertures formed around its circumference, the number of apertures corresponding to the total number of lugs on the hub and disc members. The ring is rigid in the circumferential direction and flexible to a degree, radially. As an alternative to a complete integral ring, a number of curved members each including at least three of said equi-spaced apart apertures, may form the ring. Positive circumferential torque transfer is thus achieved with resilient radial flexing allowing for radial heat expansion. One or more resilient members are secured in superposed relationship on each side of the assembled disc, the resilient members being secured, as per said one embodiment, by bolts passing through said apertures and bores in said lugs, adjacent bolts being secured, one to a lug on the hub member and one to a lug of the annular disc member. Again the resilient members are cheap to manufacture, as are the required hub and disc members, whilst the desired performance for the completed disc is achieVed at all times.

The present invention will now be further described by way of example, with reference to the accompanying drawings, in which:

FIG. 4 is an exploded view of the embodiment of FIG.3.

Figure 1:
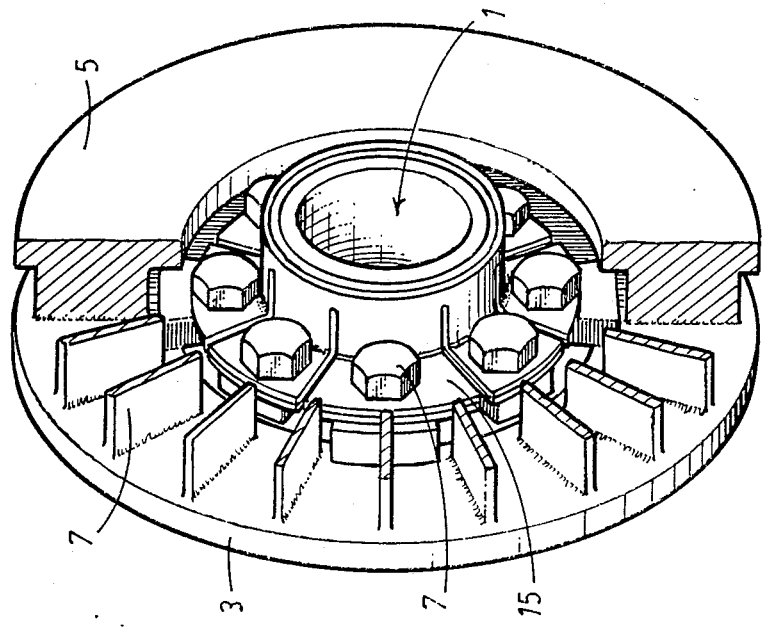
FIG. 1 is a perspective view of one embodiment of the present invention.
Figure 2:
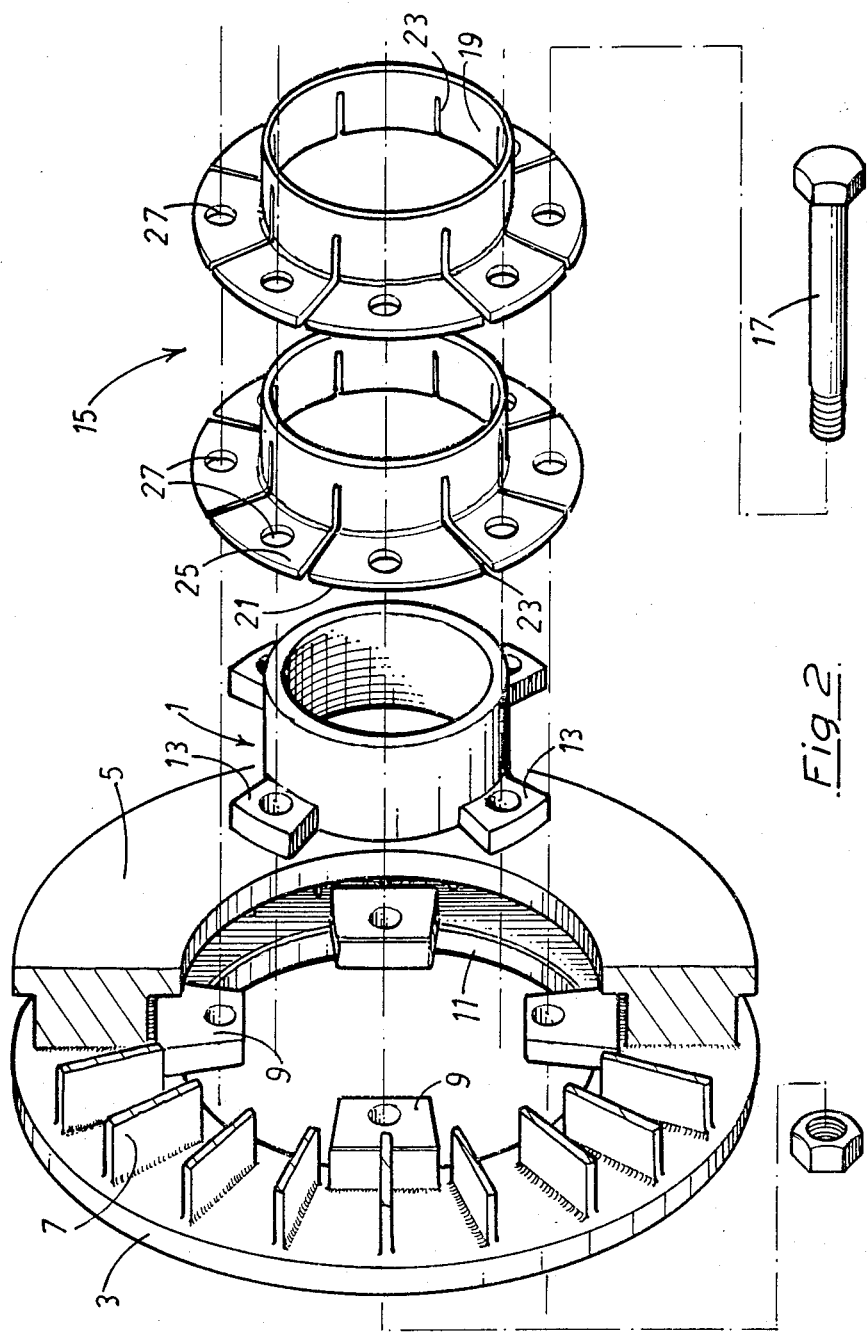
FIG. 2 is an exploded view of the embodiment of FIG. 1.

In the embodiment of the present invention illustrated in FIGS. 1 and 2 of the accompanying drawings, the disc comprises a cylindrical hub member 1 and a pair of annular disc members 3,5 coaxially arranged with respect to each other and the hub member 1, and integrally interconnected by radial vanes 7 which extend axially therebetween. One of said annular disc members 3 has four equi-spaced apart lugs 9 which extend radially inwardly from the inner edge 11 of said annular member 3, said cylindrical hub member 1 having four equi-spaced apart lugs 13 which extend radially outwardly from its outer surface. The hub member 1 is located coaxially with respect to said annular members 3,5 with each of the lugs 13 of the hub member 1 located between two adjacent lugs 9 of the annular disc member 3. All of the lugs 9,13 are then secured together by two superposed resilient members 15, and bolts 17. Each resilient member 15 is made of a resilient, flexible metal sheeting and has a cylindrical portion 19 and a radially outwardly extending flange portion 21 projecting from one axial end region of said cylindrical portion 19. Equally spaced apart slots 23 extend radially through the flange portion 21 from the perimeter of the flange portion 21, and part way along the axial length of the cylindrical portion 19. Adjacent slots 23 define a tongue 25 therebetween, each tongue 25 being provided with an aperture 27 through which a bolt 17 extends in the completed disc. Adjacent tongues 25 of the two superposed resilient members 15 are thus secured by bolts 17, one to a lug 13 of the hub member 1 and one to the adjacent lug 9 of the annular disc member 3. Thus, in use, the resilient members 15 provide for positive torque transfer in the circumferential direction whilst the resilient flange/cylindrical tongue formation allows for radial movement due to heat expansion. If desired, a larger number of lugs can be provided with a corresponding number of tongues 25 being formed on the resilient members 15. Further, only one, or more than two resilient members 15 can be used depending upon the required flexibility.

Figure 3:
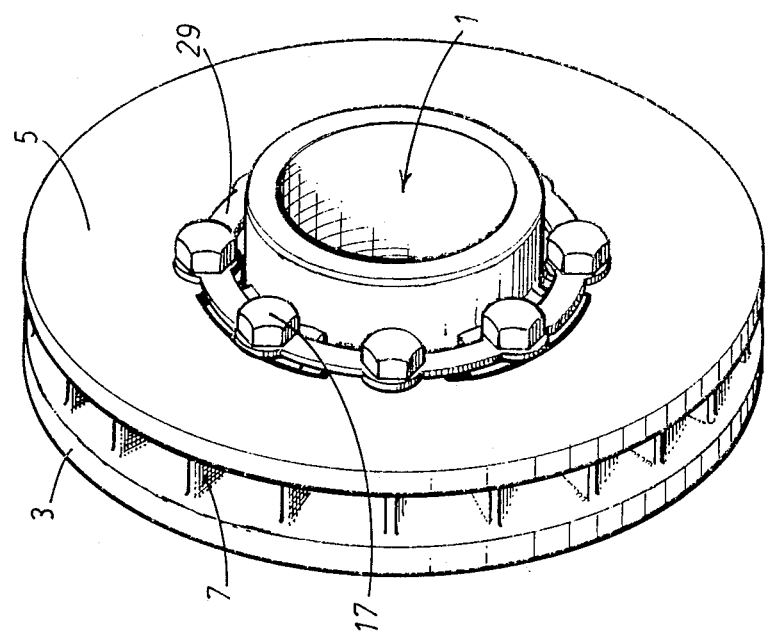
FIG. 3 is a perspective view of another embodiment of the present invention.

The other embodiment of the present invention illustrated in FIGS. 3 and 4 of the accompanying drawings, differs, in the main, from the embodiment of FIGS. 1 and 2, in respect of the construction of the resilient members 29, like reference numerals being used for all other equivalent features. The only other difference resides in the formation of the radially inwardly projecting lugs 9 which are formed on each annular disc member 3,5 and which are interconnected by a bridge portion 31. This enables lugs 13 to be provided with a larger axial dimension and thus greater strength, as well as providing an axially symmetrical disc assembly.

Each resilient member 29 is in the form of a ring made of a flexible metal with a number of equi-spaced apart apertures 27 formed around its circumference, the number of apertures 27 corresponding to the total number of lugs 9,13 on the hub 1 and disc 3,5 members. The ring is of sufficient cross-section to transmit circumferential torque transfer forces but is sufficiently flexible to allow radial deflection due to thermal expansion of the disc members 3,5 without being over-stressed. To provide the required rigidity/flexibility having regard to the desired disc performance two superposed resilient ring members 29 are provided on each side of the disc. However, if desired, any number of superposed resilient rings can be provided on each side of the disc dependent upon the required flexibility. As an alternative to a complete integral ring, a number of curved members each including at least three of said equi-spaced apart apertures 27, may form the ring. Irrespective of the ring design, bolts 17 pass through the aligned apertures 27 of the superposed rings and adjacent bolts 17 are secured, one to a lug 19 of the annular disc members 3,5 and one to a lug 13 of the hub member 1.

In both of the above embodiments of the present invention, the component parts are relatively cheap to manufacture and assemble, with the desired optimum disc performance being assured at all times.

We claim:

1. A disc for a disc brake comprising an annular disc member coaxially arranged with respect to a hub member, said disc member and said hub member being interconnected by at least one resilient member which is designed to flex generally radially but nor circumferentially, of said hub and disc members, said annular disc member having a number of circumferentially spaced apart radially inwardly projecting lugs formed on the inner periphery of the disc member, and the hub member having a like number of radially outwardly projecting lugs, each of which lugs on said hub member being located between two adjacent lugs of the annular disc member, with said resilient member interconnecting said lugs on said members, each of said resilient members including interconnected circumferentially spaced, parts equal in number and spacing to the lugs on said hub member and said annular disc member, each part having an aperture through which a bolt is passed to secure adjacent parts alternately, one to a lug on said hub member and one to a lug on said disc member.

2. A disc according to claim 1, wherein each resilient member is made of resilient, flexible material having a cylindrical portion with a radially outwardly extending flange portion projecting from one axial end region of said cylindrical portion, equally spaced apart slots extending radially through the flange portion from the perimeter of the flange portion and partway along the axial length of the cylindrical portion to thus form a tongue between adjacent slots, said tongues comprising said circumferentially spaced parts interconnected by said cylindrical portion.

3. A disc according to claim 1, wherein a number of like resilient members are superposed.

4. A disc according to claim 1, wherein each resilient member is in the form of a ring made of a flexible metal said apertures being through circumferentially spaced parts of said ring.

5. A disc according to claim 4, wherein the ring is rigid circumferentially and flexible radially by virtue of the nature of the metal and its planar configuration perpendicular to the axis of the ring.

6. A disc according to claim 4, wherein a number of said rings are superposed.

7. A disc according to claim 1, wherein the disc comprises a pair of annular disc members coaxially arranged with respect to each other and the hub member, and integrally interconnected by radial vanes which extend axially therebetween, said radially inwardly projecting lugs being formed on the inner periphery of one of said annular disc members.

8. A disc according to claim 1, wherein the disc comprises a pair of annular disc members coaxially arranged with respect to each other and the hub member, and interconnected by radial vanes which extend axially therebetween, said radially inwardly projecting lugs being formed on the inner periphery of both of said annular disc members, with axially aligned lugs being interconnected by a bridge portion.

* * * * *